US010838211B2

(12) United States Patent
Nishi

(10) Patent No.: US 10,838,211 B2
(45) Date of Patent: Nov. 17, 2020

(54) MAINTENANCE SUPPORT DEVICE AND MAINTENANCE SUPPORT SYSTEM FOR FACTORY EQUIPMENT

(71) Applicant: FANUC CORPORATION, Yamanashi (JP)

(72) Inventor: Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/953,712

(22) Filed: Apr. 16, 2018

(65) Prior Publication Data
US 2018/0307045 A1 Oct. 25, 2018

(30) Foreign Application Priority Data

Apr. 21, 2017 (JP) .................. 2017-084281

(51) Int. Cl.
G02B 27/01 (2006.01)
G06T 7/00 (2017.01)
G06K 9/00 (2006.01)

(52) U.S. Cl.
CPC ....... *G02B 27/0172* (2013.01); *G02B 27/017* (2013.01); *G06K 9/00671* (2013.01);
(Continued)

(58) Field of Classification Search
CPC ........ G02B 27/0172; G02B 2027/0138; G02B 2027/014; G02B 2027/0141; G02B 27/017; G02B 2027/0178; G06T 7/0004; G06T 2207/30164; G06T 2207/10004; G06K 9/00671; G05B 2219/24015; G05B 2219/24001; G05B 2219/24012; G05B 2219/24018; G05B 2219/2219;
(Continued)

(56) References Cited

U.S. PATENT DOCUMENTS

2016/0247324 A1* 8/2016 Mullins .................. G06F 3/012
2018/0100784 A1* 4/2018 Patil .................... G05B 23/0243

FOREIGN PATENT DOCUMENTS

JP 2001-250185 A 9/2001
JP 2001-349789 A 12/2001
(Continued)

*Primary Examiner* — Maurice L. McDowell, Jr.
*Assistant Examiner* — Donna J. Ricks
(74) *Attorney, Agent, or Firm* — Hauptman Ham, LLP

(57) ABSTRACT

A maintenance support device includes: an image analysis unit configured to extract information indicating an operational state of a piece of factory equipment, based on a real image acquired by an image capture unit of a head-mounted display including a display unit and an image capture unit configured to acquire a real image; a data storage unit configured to store the information indicating the operational state; a data analysis unit configured to determine whether or not an abnormality has occurred in a piece of factory equipment, based on the stored information indicating the operational state; and a display control unit to cause the display unit to display the augmented reality image in which an additional image is superimposed on the real scene, the additional image indicating maintenance information for the piece of factory equipment with respect to which the data analysis unit has determined that an abnormality has occurred.

10 Claims, 10 Drawing Sheets

(52) U.S. Cl.
CPC ...... *G06T 7/0004* (2013.01); *G02B 2027/014* (2013.01); *G02B 2027/0138* (2013.01); *G02B 2027/0141* (2013.01); *G06T 2207/10004* (2013.01); *G06T 2207/30164* (2013.01)

(58) Field of Classification Search
CPC ........... G05B 2219/24019; G05B 2219/24024; G05B 2219/24033; G05B 2219/24059; G05B 2219/24065; G05B 2219/24072; G05B 2219/24091; G05B 2219/24093
See application file for complete search history.

(56) References Cited

FOREIGN PATENT DOCUMENTS

| | | |
|---|---|---|
| JP | 2011-71884 A | 4/2011 |
| JP | 2014-26590 A | 2/2014 |
| JP | 2014-235704 A | 12/2014 |
| JP | 2016515897 A | 6/2016 |
| JP | 2016-173760 A | 9/2016 |
| JP | 2017-49762 A | 3/2017 |
| WO | 2012/046726 A1 | 4/2012 |

* cited by examiner

```
IDENTIFICATION : LINE I
MACHINE        : ROBOT 5
VALUE          : 153
DATE AND TIME  : APRIL 10, 2017
                 11:36:45
IMAGE TAKEN BY : OPERATOR B
GPS            : NORTH LATITUDE
                 ○△° □△' ○□"
                 EAST LONGITUDE
                 □○° △○' □△"
```

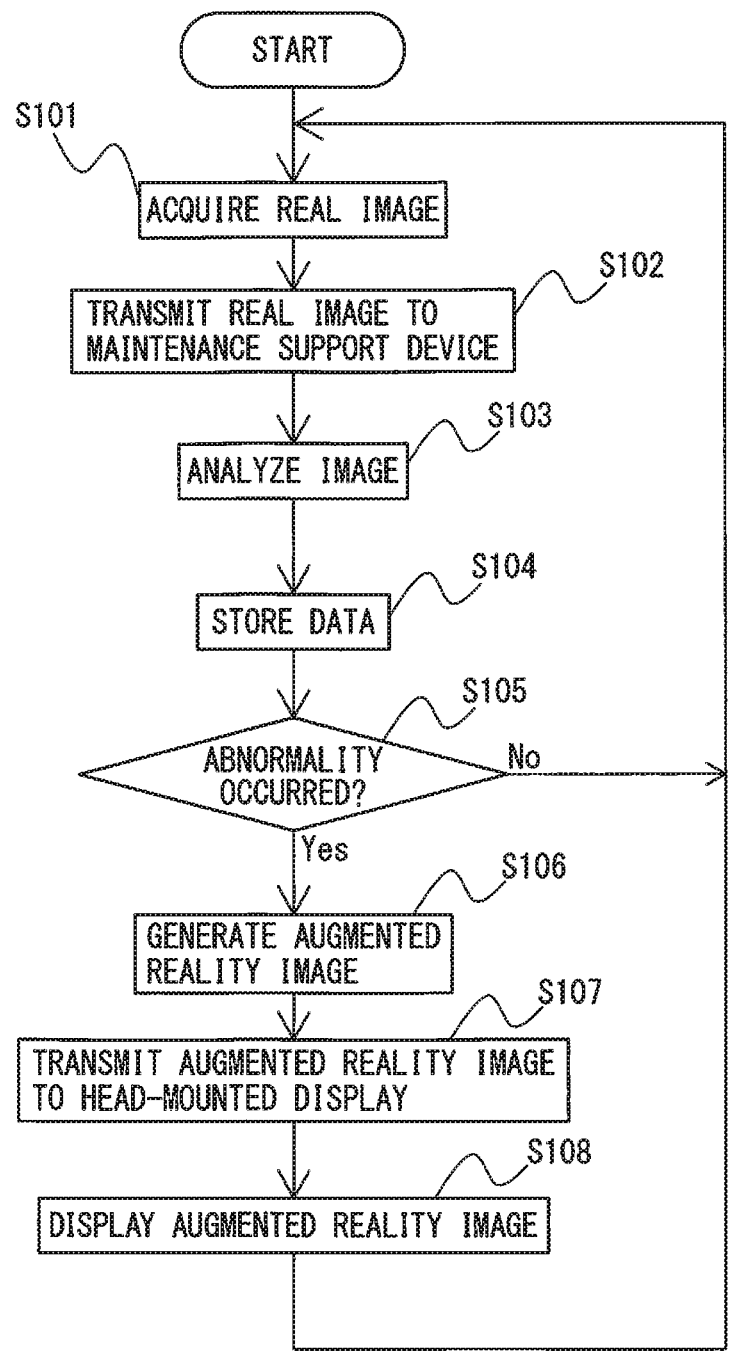

FIG. 10

| PRESENT POSITION | | 00001 N00000 | 1101 |
|---|---|---|---|
| ABSOLUTE COORDINATES | MACHINE COORDINATES | REMAINING STROKES | |

X   0.000
Y   0.000
Z   0.000

MACHINE COORDINATES
X  0.000
Y  0.000
Z  0.000

REMAINING STROKES
X  0.000
Y  0.000
Z  0.000

MODAL

F     0 MILLIMETER/MINUTE

NUMBER OF MACHINED ARTICLES
RUNNING TIME
CYCLE TIME

S     0S  100%

ABSOLUTE   RELATIVE   TOTAL

MAINTENANCE SUPPORT DEVICE AND MAINTENANCE SUPPORT SYSTEM FOR FACTORY EQUIPMENT

RELATED APPLICATIONS

The present application claims priority to Japanese Patent Application No. 2017-084281 filed on Apr. 21, 2017, the disclosure of which is hereby incorporated by reference herein in its entirety.

BACKGROUND OF THE INVENTION

1. Field of the Invention

The present invention relates to a maintenance support device and a maintenance support system for factory equipment.

2. Description of the Related Art

Maintenance of factory equipment involves, for example, visually checking various information such as values indicated on sensors, meters, or display screens provided for the factory equipment, recording the information on record sheets, and inputting the information recorded on record sheets into a computer database. This work process is repeated at certain intervals for accumulating information for a long period of time to understand the chronological changes of the data to replenish consumables, plan regular maintenance, carry out an analysis on whether or not there is an abnormality in the factory equipment and analyze data to improve the production efficiency. In recent years, with the advancement of image processing technology, various information such as values indicated on sensors, meters, or display screens and the like is in some cases obtained not by visual checks by operators but by using electronic devices.

For example, Japanese Unexamined Patent Publication (Kokai) No. 2001-250185 discloses an automatic meter inspection device for performing a centralized control of readings from measurement devices provided for users and for performing an automatic meter inspection processing at a center in which a computer is installed, the device including: a digital camera to capture a reading from a measurement device and an identification number to identify the measurement device in a same image; an image processing unit to recognize the reading and the identification number from the image captured by the digital camera; a memory unit to store a result of recognition by the image processing unit; and a display unit to display the result of recognition by the image processing unit; and an output unit to print out the result of recognition by the image processing unit.

For example, Japanese Unexamined Patent Publication (Kokai) No. 2001-349789, discloses data input device including: an image capture unit to capture an image of measurement data of a thermometer that displays measurement data on a character information display unit and to generate a character image; a character recognition unit to generate digital measurement data from the character image; and a recording unit to record the digital data.

For example, Japanese Unexamined Patent Publication (Kokai) No. 2016-173760 discloses a numerical value recognition device to recognize a numerical value indicated by a measurement device, based on an image including a numerical information provided by the measurement device, the measurement device displaying a numerical value of measurement by a plurality of rotating digit wheels, each wheel representing a digit of a multiple digit number, the wheel representing the lowest digit having gradations marked with gradation lines, the numerical value recognition device including: a memory unit to store a pattern of a sequence of digits corresponding to the digit wheels, the sequence arranged in a strip shape; an extraction unit to extract a display content included in the image and displayed by the digit wheels each representing a digit; a comparison unit to compare the display content of the digit wheels with the pattern of the sequence of digits; a recognition unit to recognize indicated values of the digits of the measurement device, based on a result of comparison of the digit wheels by the comparison unit; and a determination unit to determine a value indicated by the gradations included in the image, based on a result of comparison of the digit wheel representing the lowest digit by the comparison unit.

For example, Japanese Unexamined Patent Publication (Kokai) No. 2011-071884 discloses a work support system including: a head-mounted display worn on the head of an operator to display an image in a field of view of the operator, based on content information received; and a work support device to transmit content information to the head-mounted display, wherein the head-mounted display includes an image capturing means mounted on the head-mounted display for capturing an image of a target object in a direction of the field of view, a head movement detection means mounted on the head-mounted display for detecting a movement of the head of the operator, and an operator-side transmission means for transmitting basic image information captured by the image capturing means and head movement information detected by the head movement detection means to the work support device, and wherein the work support device includes a support-side reception means to receive the basic image information and the head movement information transmitted by the operator-side transmission means, a head movement correction means for generating corrected image information by correcting a blur in the image of the target object in the basic image information, based on the basic image information and the head movement information received by the support-side reception means, and a support-side output means for outputting the corrected image information in a specified manner.

When an operator by himself visually checks various information such as values indicated on sensors, meters, or display screens provided for the factory equipment, records the information on record sheets, and inputs the information recorded on record sheets into a computer database, and a large amount of information is to be collected, the number of work steps increases and hence the burden on the operator increases. The operator may carelessly forget to record information. In addition, the series of work steps including visual checks, recording on record sheets, and inputting to the database can only be carried out at certain intervals. Thus, even when a sensor, meter, or display screen indicates an abnormal value during the work or in a period after a while since the last work has been finished and before the next work begins, the operator may not be able to notice this and may overlook an abnormality in the factory equipment or find it too late. As a result, the operator may fail to swiftly take measures for averting the abnormal state such as opening or closing a valve or operating a switch provided for the factory equipment, and the abnormality in the factory equipment may worsen.

One way of reducing the burden on the operator and finding an abnormality in the factory equipment without failure is to establish a management system by connecting via a network the sensors, meters or displays with a super-ordinate computer, which performs a centralized control on the digital data transmitted by the sensors, meters or displays. Further, the valves and switches provided for the factory equipment may also be connected via a network to the management system to enable the superordinate computer to control the opening and closing of the valves and the operation of the switches. However, an enormous number of sensors, meters, displays, valves, and switches are provided for the factory equipment and it is very costly to connect every piece of such hardware with a superordinate computer via a network. In addition, when such a management system including the factory equipment is established at a great cost, it is not certain whether or not the expenditure can be recovered by reducing the number of work steps for the operators. Furthermore, for introducing such a management system for existing factory equipment, the works for the improvement can be carried out only when the factory equipment is not used and the factory is not in operation. One way of doing this is to carry out the improvement works on the factory equipment and the factory incrementally during regular maintenance periods or when the factory is closed or after the working hours, but the time for completion is inevitably prolonged in this case.

SUMMARY OF INVENTION

A low-cost technique is desired for easily collecting information, with little burden on the operators, for the maintenance of factory equipment to support the operators in carrying out the maintenance.

According to an aspect of the present disclosure, a maintenance support device includes: an image analysis unit configured to extract information indicating an operational state of a piece of factory equipment, based on a real image acquired by an image capture unit of a head-mounted display including a display unit configured to display an augmented reality image in which an additional image is superimposed on a real scene and an image capture unit configured to capture a real scene to acquire a real image; a data storage unit configured to store the information indicating the operational state extracted by the image analysis unit; a data analysis unit configured to determine whether or not an abnormality has occurred in a piece of factory equipment, based on the information indicating the operational state stored in the data storage unit; and a display control unit configured to cause the display unit of the head-mounted display to display the augmented reality image in which an additional image is superimposed on the real scene, the additional image indicating maintenance information for the piece of factory equipment with respect to which the data analysis unit has determined that an abnormality has occurred.

BRIEF DESCRIPTION OF THE DRAWINGS

The present invention will be more clearly understood with reference to the following accompanying drawings:

FIG. 4 is a flowchart of an operation process of the maintenance support device and the maintenance support system according to an embodiment;

FIG. 10 illustrates an example of an image displayed on a display of the operation panel in FIGS. 9A and 9B.

DETAILED DESCRIPTION

Figure 1:
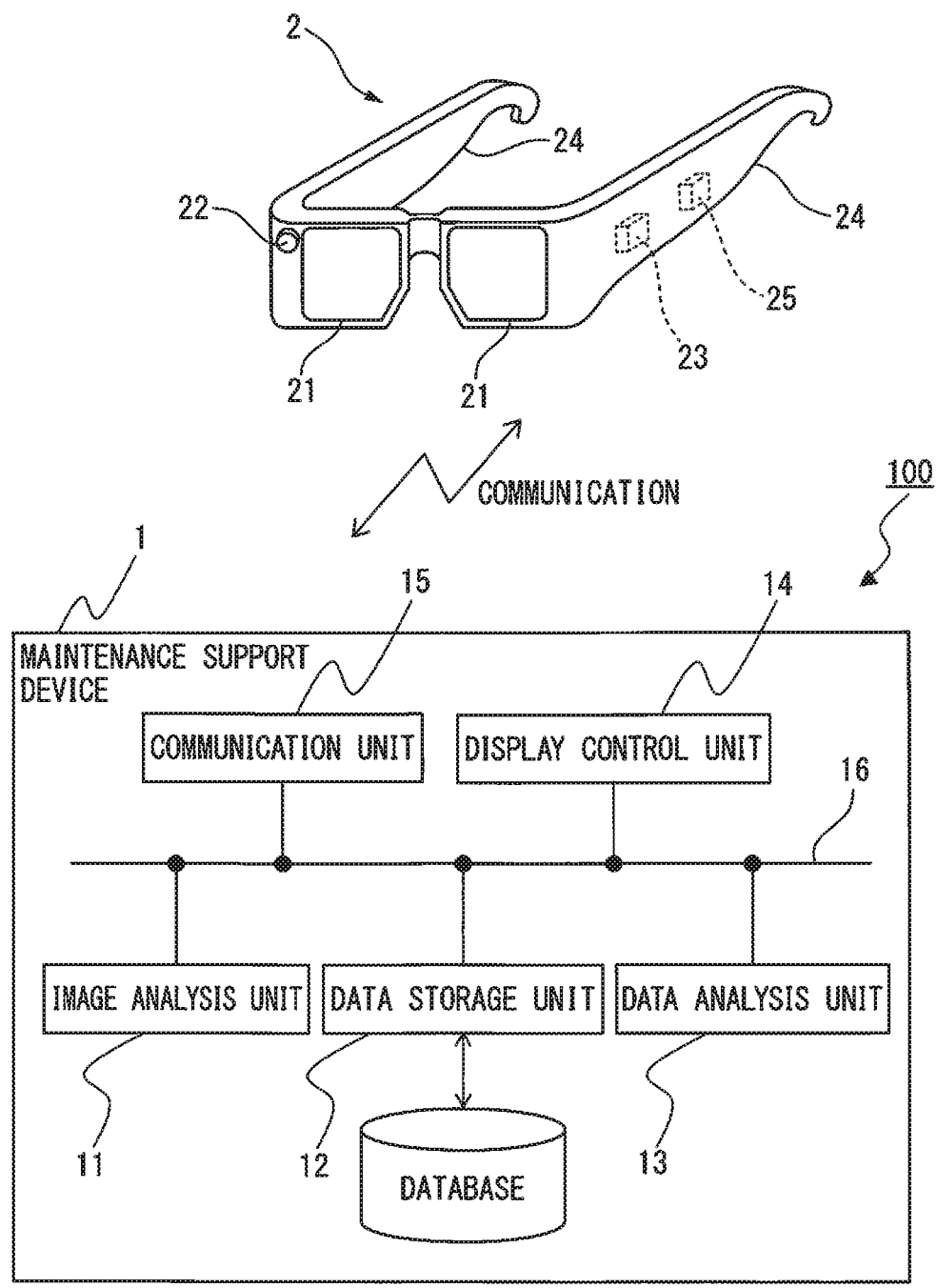
FIG. 1 illustrates a maintenance support device and a maintenance support system according to an embodiment.

A maintenance support device and a maintenance support system for factory equipment will now be described with reference to the drawings. In the drawings, like members are denoted by like reference numerals. Constituent features denoted by the same reference numerals in different drawings are to be understood to have the same functions. Further, the drawings are presented in various scales to aid the readers' understanding. The aspects illustrated in the drawings are intended to provide merely examples of carrying out the present embodiment, which is not limited to the aspects illustrated in the drawings.

FIG. 1 illustrates a maintenance support device and a maintenance support system according to an embodiment.

According to an embodiment, a maintenance support system 100 includes a maintenance support device 1 and a head-mounted display 2. When an operator (a user) wearing a head-mounted display 2 on his or her head conducts a regular work (operation, monitoring, and the like of the factory equipment), the maintenance support device 1 determines whether or not an abnormality has occurred in the factory equipment, based on a real image received from the head-mounted display 2. When the maintenance support device 1 determines that an abnormality has occurred in a piece of factory equipment, an additional image indicating maintenance information with respect to the piece of factory equipment is superimposed on the real scene and presented to the operator by means of the head-mounted display 2.

Examples of factory equipment include manufacturing machines such as robots and machine tools as well as provisions for the factory. In the present disclosure, a "robot" may include a robot as well as a robot controller to control the robot and a "machine tool" may include a machine tool as well as a numerical control (NC) device to control the machine tool. A numerical control device includes a computerized numerical control (CNC) device. Examples of machine tools include, for example, a lathe, drill machine, boring machine, milling machine, grinding machine, gear cutting machine, gear finishing machine, machining center, EDM machine, punch press machine, laser machine, carrier machine, and injection molding machine, and other various machines. Examples of provisions at factories include peripheral devices ancillary to manufacturing machines, lighting equipment, telecommunication equipment, video equipment, audio equipment, air-conditioning system, fire protection system, earthquake resisting system, security system, clocks, cleaning equipment, stationary, work clothes, doors, windows, ceilings, floors, walls, fences, lids, objects on display, and other various items.

The head-mounted display (HMD) 2, which is one of the constituent features of the maintenance support system 100, is a wearable terminal to be mounted on the head of the operator and is a kind of head-up display. An augmented reality image generated by augmented reality (AR) technology is projected in the field of view of the operator wearing the head-mounted display 2. The head-mounted display 2 is designed, for example, to be in a form of eyeglasses, in which a projector is mounted on an upper or front part of eyeglasses, projecting an image onto transparent plates, or in a form of a cap, in which a display device hangs from the brim of a cap. The head-mounted display 2 in the example illustrated in FIG. 1 is in the form of eyeglasses but the head-mounted display 2 is not limited to such a form.

The head-mounted display 2 includes a display unit 21, an image capture unit 22, a communication unit 23, a mounting unit 24, and a position information acquisition unit 25.

The display unit 21 displays an augmented reality image, in which an additional image is superimposed on a real scene, in the field of view of the operator wearing the head-mounted display 2. Augmented reality images are generated by a display control unit 14 in the maintenance support device 1, which will be described later. Methods of display that can be employed for the display unit 21 include, for example, the optical see-through method, by which an augmented reality image is displayed by superimposing an additional image on a real scene on a see-through display, and the video see-through method, by which an augmented reality image is displayed by superimposing an additional image on a real image captured by the image capture unit 22. The head-mounted display 2 of the eyeglasses type as illustrated in FIG. 1 has two display units 21 to correspond to both eyes of the operator but may have only one display unit 21 for an eye.

The image capture unit 22 captures a real scene to acquire a real image and may be, for example, a CCD camera, and a CMOS camera. To allow the image capture unit 22 to capture an object in the direction of the line of sight of the operator wearing the head-mounted display 2, the image capture unit 22 is provided for the head-mounted display 2 preferably in such a manner that the real scene viewed by the operator and the real image acquired by the image capture unit 22 capturing the real scene are almost identical.

The communication unit 23 serves to communicate with peripheral devices, which include the maintenance support device 1. The communication unit 23 transmits the real image acquired by the image capture unit 22 to the communication unit 15 of the maintenance support device 1 and receives the augmented reality image generated by the maintenance support device 1 from the communication unit 15. When the maintenance support system 100 has a plurality of head-mounted displays 2, the communication units 23 of the head-mounted displays 2 transmit information on the identities of the head-mounted displays 2 together with real images to the communication unit 15 of the maintenance support device 1. The communication unit 23 of the head-mounted display 2 is connected with the communication unit 15 of the maintenance support device 1 by, for example, wireless communication. Examples of wireless communication include a wireless LAN such as Wi-Fi, Bluetooth (registered trademark), and infrared communication. Wired communication may be used instead of wireless communication and, in such a case, the communication between the head-mounted display 2 and the maintenance support device 1 is more stable. The image capture unit 22 may be provided at any position in the head-mounted display 2.

The mounting unit 24 is for detachably mounting the head-mounted display 2 on the operator. In the head-mounted display 2 of the eyeglasses type illustrated in FIG. 1, the temples (earpieces), temple tips, and nose pads of the eyeglasses correspond to the mounting unit 24. In a head-mounted display 2 of the cap type, the crown corresponds to the mounting unit 24.

The position information acquisition unit 25 acquires position information of the head-mounted display 2 using the Global Positioning System (GPS). Thus the position information acquisition unit 25 allows the acquisition of position information of the operator wearing the head-mounted display 2. The position information acquisition unit 25 may be provided at any position in the head-mounted display 2.

The head-mounted display 2 may optionally include a microphone to convert sound around the head-mounted display 2 to electric signals and a speaker to convert electric signals to sound to be delivered to the operator wearing the head-mounted display 2.

The maintenance support device 1, which is one of the constituent features of the maintenance support system 100, includes an image analysis unit 11, a data storage unit 12, a data analysis unit 13, a display control unit 14, and a communication unit 15. The image analysis unit 11, the data storage unit 12, the data analysis unit 13, the display control unit 14, and the communication unit 15 are connected, for example, via a bus 16 to be electrically communicable with each other.

The communication unit 15 serves to communicate with peripheral devices, which include the head-mounted display 2. The communication unit 15 receives a real image acquired by the head-mounted display 2 from the communication unit 23 and transmits an augmented reality image generated by the display control unit 14 to the communication unit 23. The method of communication between the communication unit 23 of the head-mounted display 2 and the communication unit 15 of the maintenance support device 1 has been described above.

The image analysis unit 11 receives the real image acquired by the image capture unit 22 of the head-mounted display 2 via the communication unit 23 and the communication unit 15 and extracts information indicating the operational state of the piece of factory equipment, based on the real image. In so doing the image analysis unit 11 also extracts the information on the identity of the piece of factory equipment corresponding to the information indicating the operational state, based on the real image acquired by the image capture unit 22. When the real image includes a plurality of pieces of factory equipment, the image analysis unit 11 may extract, for each piece of factory equipment, information indicating operational state and information on identity. More specifically, the image analysis unit 11 detects character regions and image regions in the real image captured by the image capture unit 22, takes out characters from the character regions, and recognizes image patterns in the image regions to extract information indicating the operational state and information on the identity of the piece of factory equipment. The information indicating the operational state of the piece of factory equipment is extracted from items displayed on the display device provided for the piece of factory equipment and appearing in the real image acquired by the image capture unit 22 of the head-mounted display 2. The information on the identity of the piece of factory equipment to be extracted by the image analysis unit 11 may be in the form of character information, barcodes, QR codes (registered trademark), Data Matrix (registered trademark), Maxi Code (registered trademark), or the like. The image analysis unit 11 carries out character recognition in its image analysis processing by, for example, optical character recognition (OCR) technique. The image analysis unit 11 recognizes barcodes and the afore-mentioned two-dimensional barcodes in its image analysis processing by known techniques applied to these codes. Further, machine learning techniques may be used in the image analysis processing by the image analysis unit 11. Concrete examples of information indicating an operational state and information on identity extracted by the image analysis unit 11 will be described later.

The data storage unit 12 stores the information indicating the operational state extracted by the image analysis unit 11 in association with the information on the identity of the piece of factory equipment corresponding to the information indicating the operational state, in a database. When the maintenance support system 100 has a plurality of head-mounted displays 2, the data storage unit 12 stores the information on the identity of the piece of factory equipment corresponding to the information indicating the operational state as well as the information on the identity of the head-mounted display 2 concerned, in a database. Further, the data storage unit 12 may store the position information (indicating the position of the head-mounted display 2, i.e., the position of the operator) acquired by the position information acquisition unit 25 in association with the information indicating the operational state and information on the identity of the piece of factory equipment. The data storage unit 12 includes, for example, electrically erasable and recordable non-volatile memory such as, for example, EEPROM (registered trademark) or random access memory readable and writable at a high speed such as, for example, DRAM or SRAM.

Concrete examples of the image analysis processing by the image analysis unit 11 and the data storage processing by the data storage unit 12 will now be described with reference to FIGS. 2A, 2B, 3A, and 3B.

Figures 2A, 2B:
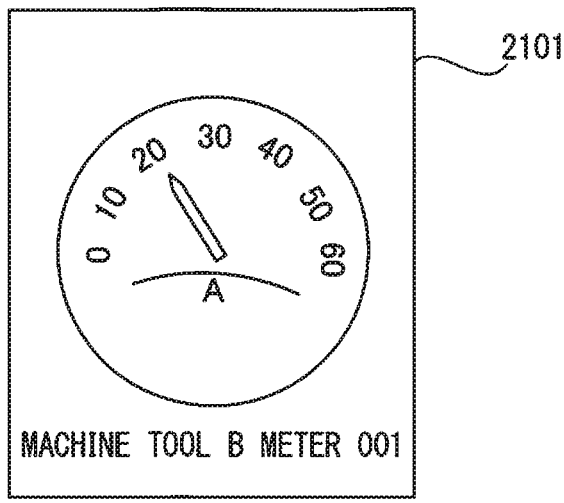
FIG. 2A illustrates an example of information indicating an operational state and information on the identity of a machine tool extracted by an image analysis unit and illustrates an example of a meter of a numerical control device of the machine tool.
FIG. 2B illustrates an example of information indicating the operational state and information on the identity of the machine tool extracted by the image analysis unit and illustrates example data of the information indicating the operational state and the information on the identity of the machine tool extracted by the image analysis unit.

FIG. 2A illustrates an example of information indicating an operational state and information on the identity of a machine tool extracted by an image analysis unit and illustrates a meter of a numerical control device of the machine tool. FIG. 2B illustrates an example of information indicating the operational state and information on the identity of the machine tool extracted by the image analysis unit and illustrates data of the information indicating the operational state and the information on the identity of the machine tool extracted by the image analysis unit. A case will be described in which a label which reads "machine tool B meter 001" is attached near a meter provided for a numerical control device 2101 of a machine tool and the pointer of the meter indicates "20 A" as illustrated in FIG. 2A. In such a case, the image analysis unit 11 performs image analysis processing to extract "machine tool B", which indicates the identity of the machine tool, and "001", which is the identification number of the meter, as information on the identity of the piece of factory equipment. The image analysis unit 11 performs image analysis processing to extract the value of electric current "20 A" as information indicating the operational state of the machine tool. As illustrated in FIG. 2B, the data storage unit 12 stores the information extracted by the image analysis unit 11, i.e., "machine tool B", "001", and "20 A" in association with, for example, the date and time when the image capture unit 22 of the head-mounted display 2 acquired the real image (or the date and time when the image analysis unit 11 performed image analysis processing or the date and time when the data storage unit 12 stored the data) and the position information acquired by the position information acquisition unit 25 of the head-mounted display 2.

Figures 3A, 3B:
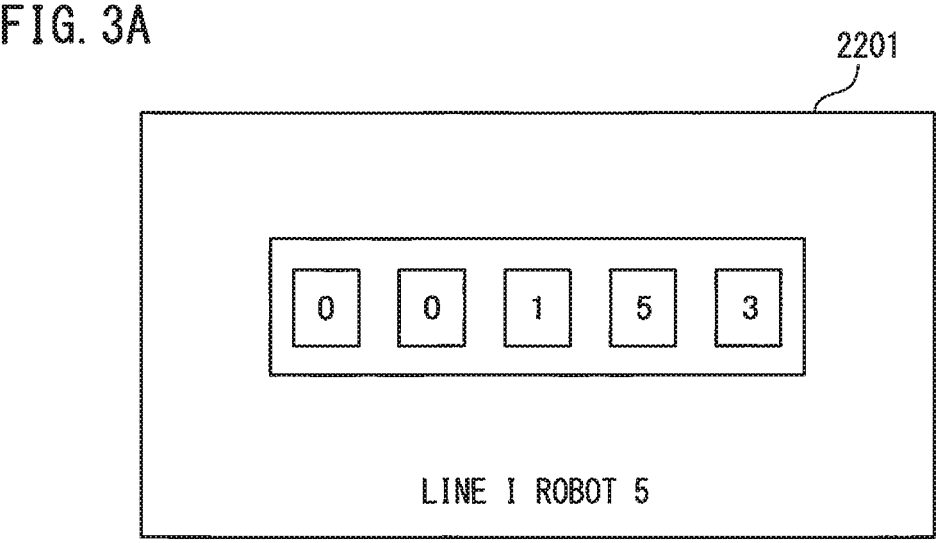
FIG. 3A illustrates an example of information indicating an operational state and information on the identity of a robot extracted by the image analysis unit and illustrates an example of a meter of a robot controller.
FIG. 3B illustrates an example of information indicating the operational state and information on the identity of the robot extracted by the image analysis unit and illustrates example data of the information indicating the operational state and the information on the identity of the robot extracted by the image analysis unit.

FIG. 3A illustrates an example of information indicating an operational state and information on the identity of a robot extracted by the image analysis unit and illustrates an example of a meter of a robot controller. FIG. 3B illustrates an example of information indicating the operational state and information on the identity of the robot extracted by the image analysis unit and illustrates example data of the information indicating the operational state and the information on the identity of the robot extracted by the image analysis unit. A case will be described in which a label which reads "line I robot 5" is attached near a meter provided for a robot controller 2201 and the digital display of the meter indicates "00153" as illustrated in FIG. 3A. In such a case, the image analysis unit 11 performs image analysis processing to extract "line I", which indicates the identity of manufacturing line for which the robot controller is provided, and "robot 5", which indicates the identity of the robot, as information on the identity of the piece of factory equipment. The image analysis unit 11 performs image analysis processing to extract the value "153" as information indicating the operational state of the robot. As illustrated in FIG. 3B, the data storage unit 12 stores the information extracted by the image analysis unit 11, i.e., "line I", "robot 5", and "153" in association with, for example, the date and time when the image capture unit 22 of the head-mounted display 2 acquired the real image (or the date and time when the image analysis unit 11 performed image analysis processing or the date and time when the data storage unit 12 stored the data) and the position information acquired by the position information acquisition unit 25 of the head-mounted display 2.

When the maintenance support system 100 has a plurality of head-mounted displays 2, the data storage unit 12 stores the information on the identity of the piece of factory equipment corresponding to the information indicating the operational state and the information on the identity of the head-mounted display 2 concerned and, for example, in FIGS. 2A, 2B, 3A, and 3B, the data storage unit 12 stores information on the operator wearing the head-mounted display 2, based on the information on the identity of the head-mounted display 2.

FIGS. 2A, 2B, 3A, and 3B illustrate the information indicating the operational state and the information on the identity of the piece of factory equipment extracted by the image analysis unit 11 and stored in the data storage unit 12 simply as examples and the items to be extracted and stored may be selected in a manner suitable to the composition of the factory equipment. Further, the values, dates and times, latitudes, longitudes, and the like given in FIGS. 2A, 2B, 3A, and 3B are also simply examples.

With reference to FIG. 1 again, the data analysis unit 13 determines whether or not an abnormality has occurred in the piece of factory equipment, based on the information indicating the operational state and the information on the identity of the piece of factory equipment stored in the data storage unit 12. The data analysis unit 13 performs abnormality determination processing for each piece of factory equipment, based on the information on the identities of the pieces of factory equipment. For example, the data analysis unit 13 successively observes pieces of information indicating the operational state of the piece of factory equipment stored in the data storage unit 12 and determines that an abnormality has occurred when the most recent piece of information indicating the operational state is out of a predefined reference range. Further, for example, the data analysis unit 13 successively observes changes in the information indicating the operational state of the piece of factory equipment stored in the data storage unit 12 and determines that an abnormality has occurred when the changes in the information indicating the operational state are out of a predefined reference range during the most recent time period of a certain duration. Further, for example, the data analysis unit 13 successively observes changes in the information indicating the operational state of the piece of factory equipment stored in the data storage unit 12 and determines that an abnormality has occurred when the difference between the changes in the information indicating the operational state during the most recent time period of a certain duration and the changes during a time period of the certain duration preceding the most recent time period of the certain duration is out of a predefined reference range for the difference. Further, the data analysis unit 13 may perform abnormality determination processing in a manner other than those described above. Machine learning techniques may be used in the data analysis processing by the data analysis unit 13.

The display control unit 14 performs control to cause the display unit 21 of the head-mounted display 2 to display an augmented reality image generated by superimposing on the real scene an additional image indicating maintenance information on the piece of factory equipment with respect to which the data analysis unit 13 has determined that an abnormality has occurred. When the maintenance support system 100 has a plurality of head-mounted displays 2, the display control unit 14 performs control to cause the display units 21 of the head-mounted displays 2 to display augmented reality images, based on the information on the identities of the head-mounted displays 2.

For example, an additional image indicating the maintenance information on the piece of factory equipment with respect to which it has been determined that an abnormality has occurred is superimposed on the real scene near the piece of factory equipment with respect to which it has been determined that the abnormality has occurred, based on the information on the identity of the piece of factory equipment with respect to which it has been determined that the abnormality has occurred. Alternatively, an additional image indicating the maintenance information on the piece of factory equipment with respect to which it has been determined that the abnormality has occurred may be superimposed at any position on the real scene. The augmented reality image generated by the display control unit 14 is sent to the display unit 21 of the head-mounted display 2 via the communication unit 15 and the communication unit 23 of the head-mounted display 2. Alternatively, the additional image generated by the display control unit 14 and indicating the maintenance information may be transmitted to the display unit 21 of the head-mounted display 2 via the communication unit 15 and the communication unit 23 of the head-mounted display 2 to generate an augmented reality image in the head-mounted display 2 by superimposing the received additional image on the real scene. The display unit 21 displays the augmented reality image in the field of view of the operator wearing the head-mounted display 2 under the control of the display control unit 14.

Maintenance information on a piece of factory equipment may concern, for example, replacing a component constituting a device, replacing tools, replacing provisions, replenishing consumables, changing design, emergency stop of a device or the manufacturing line including the device, shutting down power supply, diversion operation, relocating devices and products, removing alien objects, adding to raw materials, adjusting temperature, adjusting humidity, adjusting atmospheric pressure, cleaning, and the like.

The additional image may include information other than maintenance information. Examples of information other than maintenance information include date and time, temperature, humidity, atmospheric pressure, weather, earthquake early warning, operation guide for the factory equipment, messages to the operator wearing the head-mounted display 2, information to be shared by a plurality of operators, supportive information for unexperienced operators, and the like.

The additional image to be superimposed on the real scene may be a still image or a moving image and expressed by characters, icons, animation, or a combination of these.

The above-described image analysis unit 11, the data storage unit 12, the data analysis unit 13, and the display control unit 14 may be realized, for example, by a software program or a combination of electronic circuits of various kinds and a software program. When, for example, these units are realized by a software program, the above-described functions of these units are realized by an arithmetic processing unit that is provided in the maintenance support device 1 and operates according to the software program. Alternatively, the image analysis unit 11, the data storage unit 12, the data analysis unit 13, and the display control unit 14 may be realized by a semiconductor integrated circuit with a software program written therein to carry out the functions of these units.

The maintenance support system 100 may have a plurality of head-mounted displays 2 and, in such a case, the maintenance support device 1 performs control to analyze the real images sent by the plurality of head-mounted displays 2 and to cause the plurality of head-mounted displays 2 to display augmented reality images.

Further, for example, a plurality of maintenance support devices 1 may be incorporated in a network with which a plurality of manufacturing cells are connected. The information indicating the operational state and the information on the identity of a piece of factory equipment extracted by the image analysis unit 11 of each maintenance support device 1 connected with the network can be shared in a cloud server, by cell controllers superordinate to the manufacturing cells or by a production control apparatus superordinate to the cell controllers. Further, for example, the data storage unit 12, the data analysis unit 13, and the display control unit 14 of the maintenance support devices 1, or these units together with the image analysis unit 11, may be provided in a cloud server, a cell controller, or a production control apparatus. With this network connection, augmented reality images are generated based on the real images sent by the plurality of head-mounted displays 2 and the display control unit 14 can cause the display units 21 of the head-mounted displays 2 to display the augmented reality images.

A manufacturing cell is a set of machine tools and robots flexibly combined for product manufacturing. A manufacturing cell is formed by, for example, a plurality of machine tools and robots or a plurality of kinds of machine tools and robots, with no limitation on the number of machine tools and robots in a manufacturing cell. For example, a manufacturing cell may be a manufacturing line on which a workpiece is machined by a plurality of machine tools and robots in order and made into a finished product. Further, for example, a manufacturing cell may be a manufacturing line in which two or more articles (components) respectively machined by two or more machine tools and robots are assembled by another machine tool in the manufacturing process into a finished article (product). Further, for example, two or more articles machined in two or more manufacturing cells may be assembled into a finished article (product). Manufacturing cells and cell controllers are communicably connected with each other via a communication network such as an intranet. Manufacturing cells are organized in a factory where the products are manufactured. In contrast, cell controllers may be provided in the factory where manufacturing cells are organized or in a building separate from the factory. For example, cell controllers may be provided in a separate building located on the same premise as the factory where manufacturing cells are organized.

A production control apparatus is provided superordinate to cell controllers. A production control apparatus is mutually communicably connected with cell controllers and gives instructions to the cell controllers according to a production plan. A production control apparatus may be provided in an office remotely located from the factory. In such a case, the cell controllers and the production control apparatus are mutually communicably connected via a communication network such as the Internet.

FIG. 4 is a flowchart of an operation process of the maintenance support device and the maintenance support system according to an embodiment.

When the operator wearing the head-mounted display 2 works standing in front of a piece of factory equipment, the piece of factory equipment appears in the field of view of the operator by means of the display unit 21 of the head-mounted display 2. The image capture unit 22 of the head-mounted display 2 captures this real scene to acquire a real image (S101).

At step S102, the communication unit 23 of the head-mounted display 2 transmits the real image acquired by the image capture unit 22 to the communication unit 15 of the maintenance support device 1. The position information of the head-mounted display 2, acquired by the position information acquisition unit 25, is also transmitted to the communication unit 15 of the maintenance support device 1 together with the real image.

When the communication unit 15 of the maintenance support device 1 has received the real image, the image analysis unit 11 extracts information indicating the operational state and information on the identity of the piece of factory equipment by analyzing the real image at step S103. When a plurality of pieces of factory equipment appear on the real image, the image analysis unit 11 extracts, for each piece of factory equipment, information indicating the operational state and information on the identity of the piece of factory equipment.

At step S104, the data storage unit 12 stores the information indicating the operational state extracted by the image analysis unit 11 in association with the information on the identity of the piece of factory equipment corresponding to the information indicating the operational state, in a database. In so doing, the data storage unit 12 may store the position information (indicating the position of the head-mounted display 2, i.e., the position of the operator) acquired by the position information acquisition unit 25 and the date and time when the image capture unit 22 of the head-mounted display 2 acquired the real image (or the date and time when the image analysis unit 11 performed image analysis processing or the date and time when the data storage unit 12 stored the data) in association with the information indicating the operational state and information on the identity of the piece of factory equipment.

At step S105, the data analysis unit 13 determines whether or not an abnormality has occurred in the piece of factory equipment, based on the information indicating the operational state and the information on the identity of the piece of factory equipment stored in the data storage unit 12. The data analysis unit 13 performs the abnormality determination processing for each piece of factory equipment, based on the information on the identity of the piece of factory equipment. When the data analysis unit 13 determines that an abnormality has occurred in a piece of factory equipment, the process proceeds to step S106. When the data analysis unit 13 has determines that no abnormality has occurred in the factory equipment, the process returns to step S101.

At step S106, an augmented reality image is generated by superimposing on the real scene an additional image indicating maintenance information for the piece of factory equipment with respect to which the data analysis unit 13 has determined that an abnormality has occurred.

The augmented reality image generated by the display control unit 14 is sent to the display unit 21 of the head-mounted display 2 via the communication unit 15 and the communication unit 23 of the head-mounted display 2 at step S107.

At step S108, the display unit 21 displays the augmented reality image that it has received in the field of view of the operator wearing the head-mounted display 2.

Some concrete examples of processing by the maintenance support device 1 and the head-mounted display 2 will now be described with reference to FIGS. 5 to 10.

Figure 5:
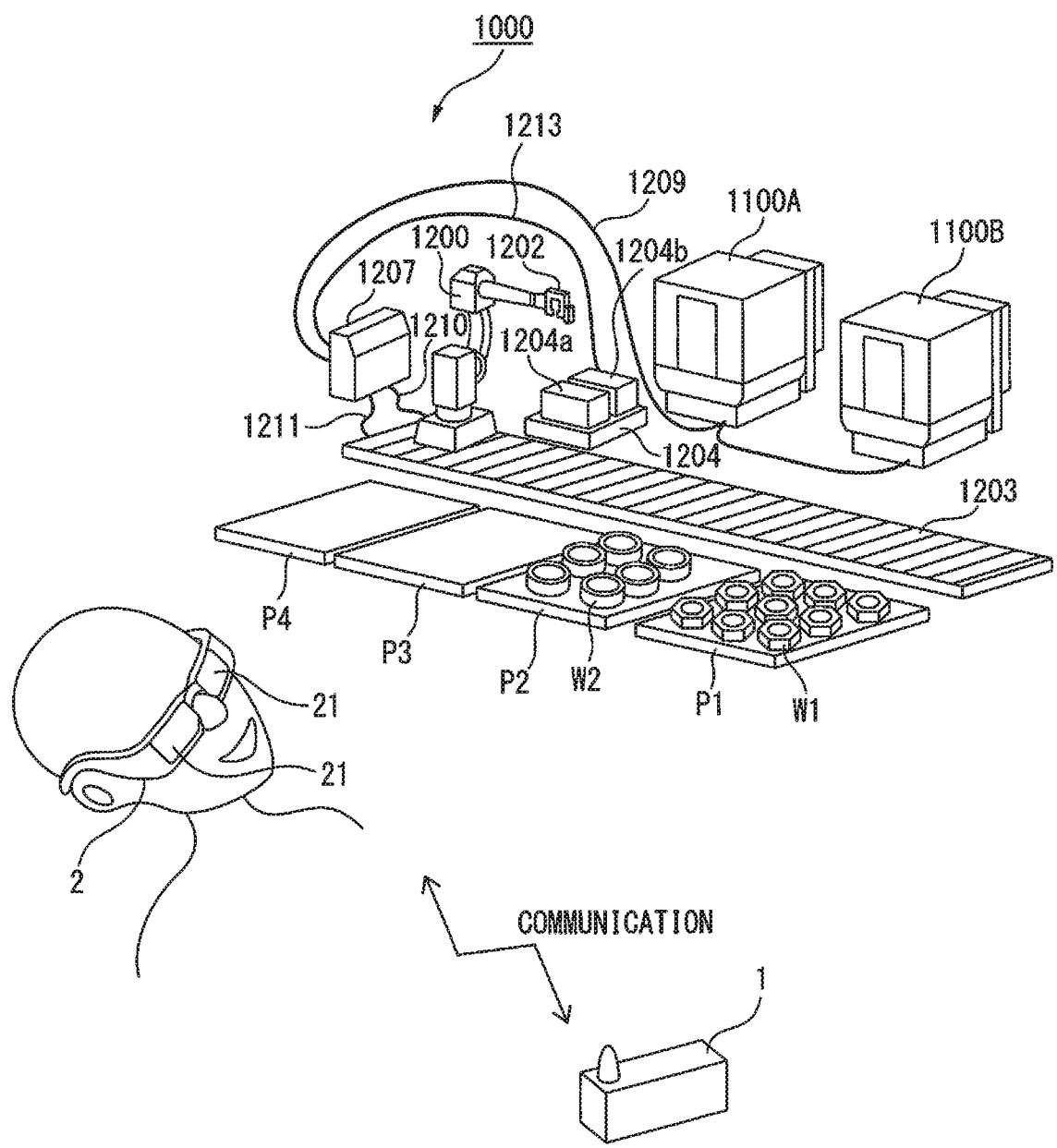
FIG. 5 illustrates an example of application of the maintenance support system according to an embodiment to an automated machining system that includes a combination of a robot and machine tools.
Figure 6:
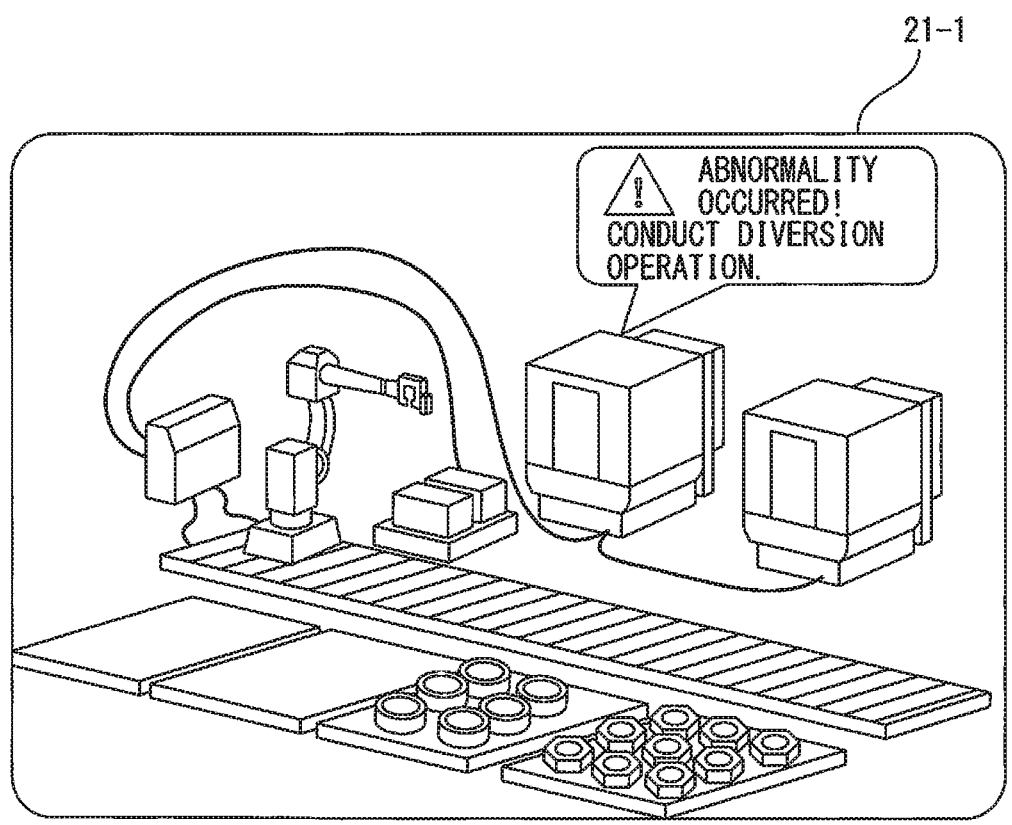
FIG. 6 illustrates an augmented reality image viewed by the operator illustrated in FIG. 5 by using a head-mounted display.

FIG. 5 illustrates an example of application of the maintenance support system according to an embodiment to an automated machining system including a combination of a robot and machine tools; and FIG. 6 illustrates an augmented reality image viewed by the operator illustrated in FIG. 5 by using a head-mounted display. The automated machining system 1000 includes a combination of a robot 1200 and machine tools 1100A and 1101B.

The robot 1200 includes a work tool 1202 and is controlled by a robot controller 1207 connected with the robot 1200 by a robot connection cable 1210. The robot controller 1207 is connected with a traveling axis 1203 by a traveling axis connection cable 1211 and the robot controller 1207 performs control to operate the traveling axis 1203 to move robot 1200. The robot controller 1207 is connected with a temporary placement table 1204 by a temporary placement table connection cable 1213. The temporary placement table 1204 has temporary workpiece placement areas 1204a, 1204b. The robot controller 1207 and the machine tools 1100A, 1101B are connected with each other by a network cable 1209. The reference numerals P1, P2, P3, and P4 denote pallets. The reference numeral W1 denotes a workpiece to be machined by the machine tool 1100A and the reference numeral W2 denotes a workpiece to be machined by the machine tool 1100B.

For example, a case will be described in which the workpiece W1 on the pallet P1 is machined by the machine tool 1100A. First, the traveling axis 1203 operates to bring the robot 1200 close to the pallet P1, and the robot 1200 grips the workpiece W1 on the pallet P1 with the work tool 1202, temporarily places the workpiece W1 on the temporary workpiece placement area 1204a of the temporary placement table 1204, then takes out a workpiece already machined from the machine tool 1100A, using the work tool 1202, and temporarily places the machined workpiece on the temporary workpiece placement area 1204b. The robot 1200 then grips the workpiece W1, which has been temporarily placed in the temporary workpiece placement area 1204a of the temporary placement table 1204, with work tool 1202, sets the workpiece W1 to the machine tool 1100A, and then grips the machined workpiece, which has been temporarily placed on the temporary workpiece placement area 1204b of the temporary placement table 1204, with the work tool 1202, and places the machined workpiece on the pallet P3. The robot 1200 repeats the above-described series of operations under the control of the robot controller 1207. Similarly, the workpiece W2 on the pallet P2 is set to the machine tool 1100B by the robot 1200 performing the series of operations and, after having been processed, taken out from the machine tool 1100B by the robot 1200 performing the series of operations, and then placed on the pallet P4.

It is common that a factory has an array of automated machining systems 1000 (manufacturing cells) as those described above arranged side by side. When the operator wearing the head-mounted display 2 works standing in front of an automated machining system 1000, the automated machining system 1000 appears in the field of view of the operator by means of the display unit 21 of the head-mounted display 2. The image capture unit 22 of the head-mounted display 2 captures a real image at this time and the image analysis unit 11 extracts information indicating the operational states and information on the identity of the robot 1200 and the machine tools 1100A and 1100B, from this real image. The data storage unit 12 stores the pieces of information indicating the operational states of the robot 1200 and the machine tools 1100A and 1100B, extracted by the image analysis unit 11, in association with the respective pieces of information on their identities, in a database. The data analysis unit 13 determines whether or not an abnormality has occurred in any one of the robot 1200 and machine tools 1100A and 1100B, based on the pieces of information indicating the operational states and the pieces of information on the identities of the robot 1200 and the machine tools 1100A and 1100B stored in the data storage unit 12. For example, when the data analysis unit 13 determines that an abnormality has occurred in the machine tool 1100A, the display control unit 14 performs control to cause the display unit 21 of the head-mounted display 2 to display an augmented reality image generated by superimposing on the real scene an additional image indicating, for example, "Abnormality Occurred! Conduct Diversion Operation." as maintenance information for the machine tool 1100A in which the abnormality has occurred. As illustrated in FIG. 6, the display unit 21 displays the augmented reality image 21-1 in the field of view of the operator wearing the head-mounted display 2 under the control of the display control unit 14.

Figure 7A:
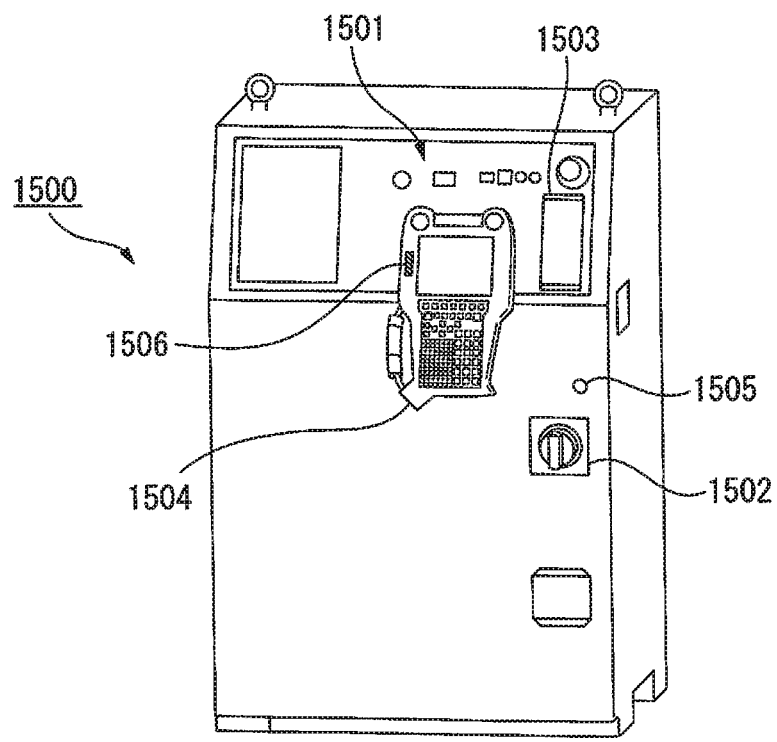
FIG. 7A illustrates an example of an exterior view of a robot controller and is a perspective view illustrating the front side of the robot controller.
Figure 7B:
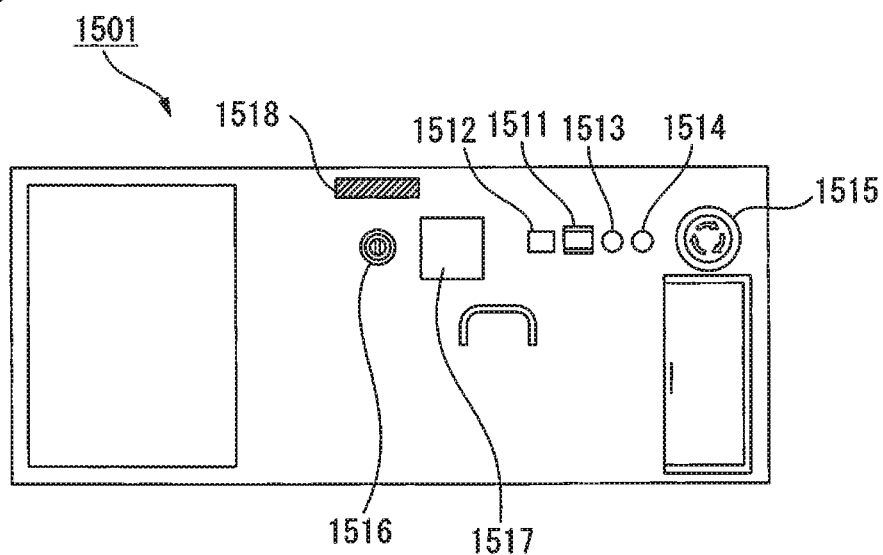
FIG. 7B illustrates an example of an exterior view of the robot controller and is an enlarged view of an operation panel of the robot controller.

FIG. 7A illustrates an example of an exterior view of the robot controller and is a perspective view illustrating the front side of the robot controller. FIG. 7B illustrates an example of an exterior view of the robot controller and is an enlarged view of an operation panel of the robot controller. As illustrated in FIG. 7A, the robot controller 1500 includes an operation panel 1501, a breaker 1502, a USB port 1503, a teach pendant 1504, and a key 1505. To the teach pendant 1504 is attached a sticker 1506 with information on the identity of the robot printed thereon. As illustrated in FIG. 7B, the operation panel 1501 includes a start button 1511, an alarm release button 1512, an alarm lamp 1513, a power supply lamp 1514, an emergency stop button 1515, a mode switch 1516, and an hour meter 1517. To the operation panel 1501 is attached a sticker 1518 with information on the identity of the robot printed thereon. The hour meter 1517 is a meter to count operation time of the robot. When operating the robot, the operator operates the mode switch 1516 to switch between modes, for example, a mode for recording teach points by operating the axes of the robot, a mode for checking the teach points, and a mode for causing the robot to engage in manufacturing work. The operator operates the mode switch 1516 frequently and, when the operator does so, the hour meter 1517 and the sticker 1518 with information on identity of the robot printed thereon appear in the field of view of the operator. The image capture unit 22 of the head-mounted display 2 worn by the operator acquires a real image at this time and the image analysis unit 11 extracts information indicating the operational state (value indicated by the hour meter 1517) and information on the identity of the robot, based on the real image. The data storage unit 12 stores the information indicating the operational state (value indicated by the hour meter 1517) of the robot extracted by the image analysis unit 11 in association with the information on the identity of the robot, in a database. The data analysis unit 13 determines whether or not an abnormality has occurred in the robot, based on the information indicating the operational state (value indicated by the hour meter 1517) and the information on the identity of the robot stored in the data storage unit 12. When the data analysis unit 13 determines that an abnormality has occurred in the robot, the display control unit 14 performs control to cause the display unit 21 of the head-mounted display 2 to display an augmented reality image generated by superimposing on the real scene an additional image indicating maintenance information for the robot in which the abnormality has occurred. The display unit 21 displays the augmented reality image in the field of view of the operator wearing the head-mounted display 2 under the control of the display control unit 14.

Figure 8A:
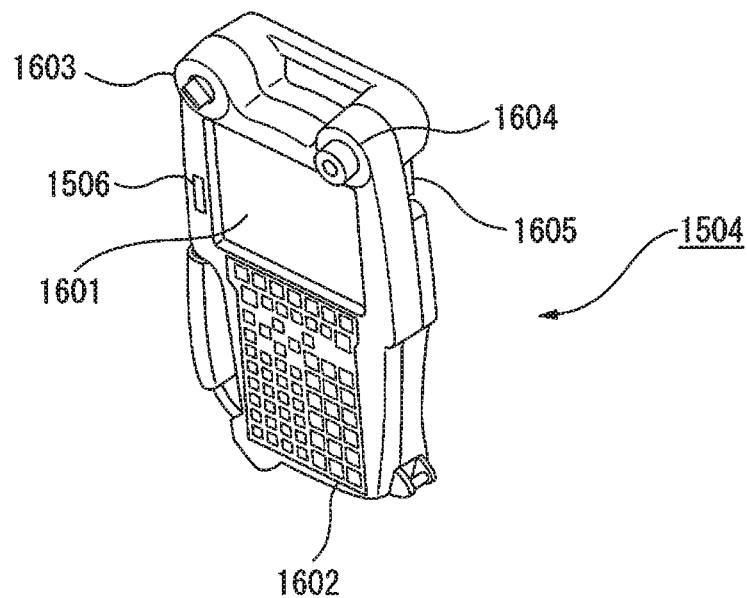
FIG. 8A is a perspective view illustrating an example of an exterior view of a teach pendant and illustrates the front side of the teach pendant.
Figure 8B:
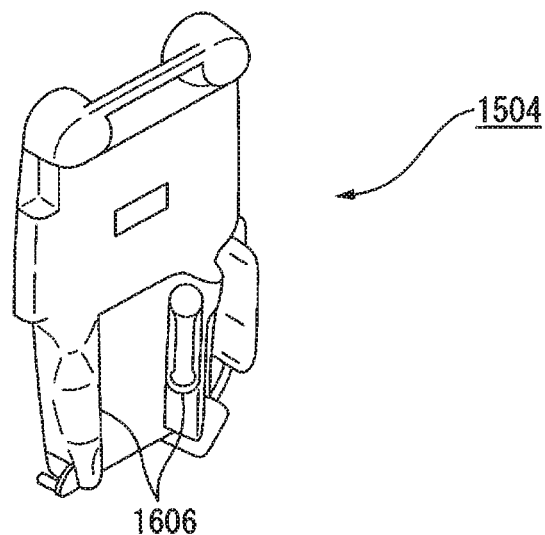
FIG. 8B is a perspective view illustrating an example of an exterior view of the teach pendant and illustrates the back side of the teach pendant.

FIG. 8A is a perspective view illustrating an example of an exterior view of a teach pendant and illustrates the front side of the teach pendant. FIG. 8B is a perspective view illustrating an example of an exterior view of the teach pendant and illustrates the back side of the teach pendant. The teach pendant 1504 includes a display 1601, operation keys 1602, an Enable/Disable switch 1603, an emergency stop button 1604, a USB port 1605, and a dead man's switch 1606. To the teach pendant 1504 is attached a sticker 1506 with information on the identity of the robot printed thereon. When operating the robot, the operator operates on the operation keys 1602 of the teach pendant 1504. When the operator does so, the display 1601 and the sticker 1506 with information on identity of the robot printed thereon appear in the field of view of the operator. The image capture unit 22 of the head-mounted display 2 worn by the operator acquires a real image at this time and the image analysis unit 11 extracts information indicating the operational state (for example, the content of teaching displayed on the display 1601) and information on the identity of the robot, based on the real image. The data storage unit 12 stores the information indicating the operational state of the robot extracted by the image analysis unit 11 in association with the information on the identity of the robot, in a database. The data analysis unit 13 determines whether or not an abnormality has occurred in the robot (for example, an error in the content of teaching), based on the information indicating the operational state and the information on the identity of the robot stored in the data storage unit 12. When the data analysis unit 13 determines that an abnormality has occurred in the robot, the display control unit 14 performs control to cause the display unit 21 of the head-mounted display 2 to display an augmented reality image generated by superimposing on the real scene an additional image indicating maintenance information for the robot in which the abnormality has occurred. The display unit 21 displays the augmented reality image in the field of view of the operator wearing the head-mounted display 2 under the control of the display control unit 14.

Figure 9A:
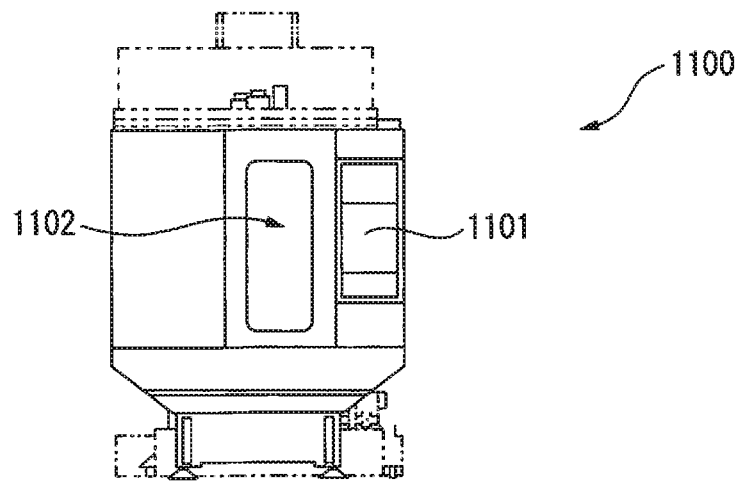
FIG. 9A illustrates an example of an exterior view of a machine tool and is a front view of the machine tool.
Figure 9B:
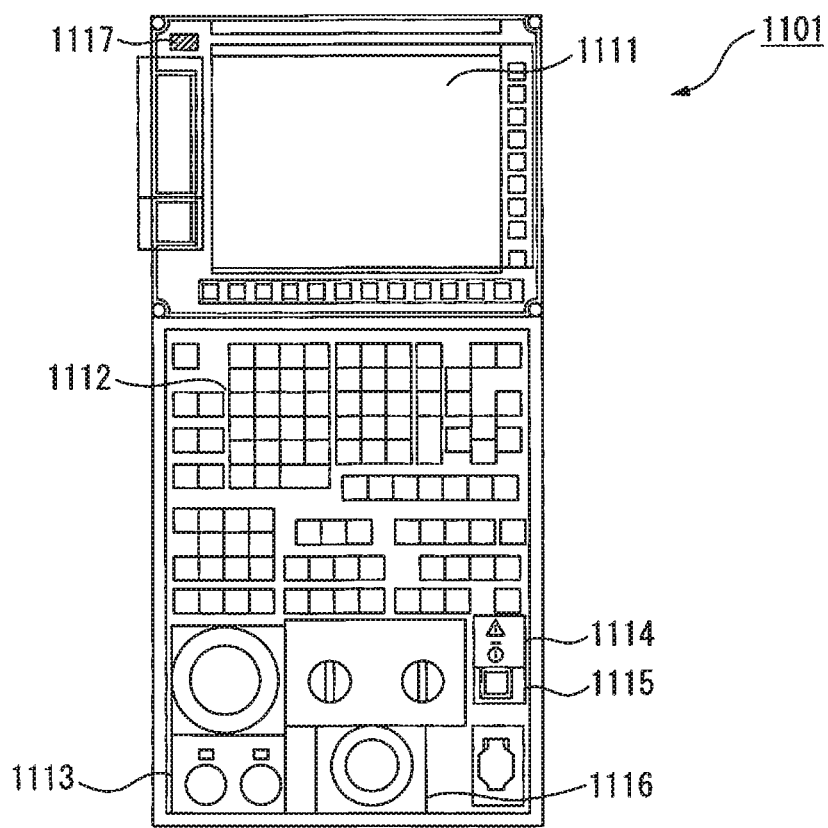
FIG. 9B illustrates an example of an exterior view of a machine tool and is an enlarged view of an operation panel of the machine tool.

FIG. 9A illustrates an example of an exterior view of a machine tool and is a front view of the machine tool. FIG. 9B illustrates an example of an exterior view of a machine tool and is an enlarged view of an operation panel of the machine tool. FIG. 10 illustrates an example of an image displayed on the display of the operation panel in FIGS. 9A and 9B. As illustrated in FIG. 9A, the machine tool 1100 includes an operation panel 1101 and a door 1102. The door 1102 is closed during the machining of a workpiece, to separate the machining room in which the workpiece is placed from the outside. The workpiece is brought in and taken out by opening the door 1102. The operator operates the machine tool 1100 by using the operation panel 1101. As illustrated in FIG. 9B, the operation panel 1101 includes a display 1111, operation keys 1112, a Start/Stop button 1113, an alarm lamp 1114, a power supply button 1115, and an emergency stop button 1116. To the operation panel 1101 is attached a sticker 1117 with information on the identity of the robot printed thereon. The display 1111 displays, for example, an image as illustrated in FIG. 10 and, by watching the displayed image, the operator can check, for example, the present values of the machine axes, the program number of the machining program in operation, line number, speed, number of machined articles, running time, cycle time of the machine tool 1100. The operator operates on the operation keys 1112 watching the display 1111 of the operation panel 1101. When the operator does so, the display 1111, the alarm lamp 1114, and the sticker 1117, with information on the identity of the machine tool 1100 printed thereon, of the operation panel 1101 appear in the field of view of the operator. The image capture unit 22 of the head-mounted display 2 worn by the operator acquires a real image at this time and the image analysis unit 11 extracts information indicating the operational state and information on the identity of the machine tool 1100, based on the real image. Information indicating the operational state of the machine tool 1100 includes, for example, the present values of the machine axes, the program number of the machining program in operation, line number, speed, number of machined articles, running time, and cycle time displayed on the display 1111 as well as whether or not the alarm lamp 1114 is on. The data storage unit 12 stores the information indicating the operational state of the machine tool 1100 extracted by the image analysis unit 11 in association with the information on the identity of the machine tool 1100, in a database. The data analysis unit 13 determines whether or not an abnormality has occurred in the machine tool 1100, based on the information indicating the operational state and the information on the identity of the machine tool 1100 stored in the data storage unit 12. When the data analysis unit 13 determines that an abnormality has occurred in the machine tool 1100, the display control unit 14 performs control to cause the display unit 21 of the head-mounted display 2 to display an augmented reality image generated by superimposing on the real scene an additional image indicating maintenance information for the machine tool 1100 in which the abnormality has occurred. The display unit 21 displays the augmented reality image in the field of view of the operator wearing the head-mounted display 2 under the control of the display control unit 14.

As described above, according to an aspect of the present disclosure, it is possible to provide a maintenance support device and a maintenance support system at a low cost for easily collecting information, with little burden on the operators, for the maintenance of factory equipment to support the operators carrying out the maintenance.

According to an aspect of the present disclosure, based on a real scene that appears in the field of view of an operator wearing a head-mounted display when the operator carries out an operation, an augmented reality image including maintenance information for a piece of factory equipment is displayed in the head-mounted display; therefore, the operator can easily collect information for the maintenance of the piece of factory equipment by means of the head-mounted display.

Further, since it is possible to collect information for the maintenance of the factory equipment during the regular work of the operators in the factory (for example, operation or monitoring of the factory equipment) by means of the head-mounted display, it is not necessary to employ operators (operators specialized in maintenance) for collecting information for the maintenance and hence the personnel expenditure can be reduced. Further, since the information for the maintenance is constantly collected during the regular work of the operators in the factory by means of the head-mounted display, the precision of the information improves, which helps to detect an occurrence of abnormality even more exactly. Further, since it is not necessary to record various information on record sheets or input information into a computer, it is possible to reduce the burden on the operators and prevent a failure to notice an occurrence of abnormality due to an operator's failure to make a record of the relevant information or an error in inputting the information to the computer.

Further, since it is possible to provide maintenance information for the factory equipment during the regular work of the operators in the factory by means of the head-mounted display, the operators can take a swift and appropriate action to address an occurrence of abnormality in the factory equipment. Further, the operators can visually recognize maintenance information on the real scene by using the head-mounted display, which helps the operators to identify the piece of factory equipment in need of maintenance (the piece of factory equipment in which an abnormality has occurred) and to understand the work to be done for the maintenance and reduces the burden on the operators.

Further, according to an aspect of the present disclosure, since the maintenance information is provided by a head-mounted display, which is a wearable terminal, together with a maintenance support device executing arithmetic processing, a maintenance support system can be established at low cost, with no need for improving the hardware of the factory equipment or the entire factory.

The invention claimed is:

1. A maintenance support device, comprising:
    an image analysis unit configured to extract information indicating an operational state of a piece of factory equipment, by
        detecting character regions and image regions in a real image captured by an image capture unit of a head-mounted display comprising a display unit configured to display an augmented reality image in which an additional image is superimposed on a real scene and the image capture unit configured to capture the real scene to acquire the real image,
        taking out characters from the character regions, and recognizing image patterns in the image regions;
    a data storage unit configured to store the information indicating the operational state extracted by the image analysis unit;
    a data analysis unit configured to determine whether or not an abnormality has occurred in the piece of factory equipment, based on the information indicating the operational state stored in the data storage unit; and
    a display control unit configured to cause the display unit of the head-mounted display to display the augmented reality image in which the additional image is superimposed on the real scene, the additional image indicating maintenance information for the piece of factory equipment with respect to which the data analysis unit has determined that the abnormality has occurred, wherein
    the data analysis unit is configured to
        determine that the abnormality has occurred, in response to a difference between (i) a first change in the information indicating the operational state during a first time period and (ii) a second change in the information indicating the operational state during a second time period preceding the first time period being out of a predetermined range of difference, and
        determine that the abnormality has not occurred, in response to the difference between (i) the first change and (ii) the second change being within the predetermined range of difference, and
    the maintenance information for the piece of factory equipment is information on maintenance including at least one of replacing a component constituting a device, replacing tools, replacing provisions, replenishing consumables, changing design, emergency stop of a device or manufacturing line including the device, shutting down power supply, diversion operation, relocating devices and products, removing alien objects, adding to raw materials, adjusting temperature, adjusting humidity, adjusting atmospheric pressure, and cleaning.

2. The maintenance support device according to claim 1, wherein the image analysis unit is configured to extract information on identity of the piece of factory equipment corresponding to the information indicating the operational state, based on the real image acquired by the image capture unit of the head-mounted display,
    wherein the data storage unit is configured to store the information indicating the operational state extracted by the image analysis unit in association with the information on the identity, and
    wherein the data analysis unit is configured to determine whether or not the abnormality has occurred in the piece of factory equipment that the information on the identity concerns, based on the information indicating the operational state and the information on the identity stored in the data storage unit.

3. The maintenance support device according to claim 1, wherein the display control unit is configured to cause the display unit of the head-mounted display to display the augmented reality image in which the additional image indicating the maintenance information is superimposed on the real scene near the piece of factory equipment in response to a determination that the abnormality has occurred.

4. The maintenance support device according to claim 1, wherein the image analysis unit is configured to extract the information indicating the operational state from an item displayed on a display device provided for the piece of factory equipment, the item appearing in the real image acquired by the image capture unit of the head-mounted display.

5. The maintenance support device according to claim 1, wherein the piece of factory equipment is a manufacturing machine.

6. The maintenance support device according to claim 1, wherein the piece of factory equipment is a provision for a factory.

7. A maintenance support system, comprising:
    a head-mounted display comprising
        a display unit configured to display an augmented reality image in which an additional image is superimposed on a real scene,
        an image capture unit configured to capture the real scene to acquire a real image,
        a communication unit configured to communicate with a peripheral device, and
        a mounting unit configured to detachably mount the head-mounted display on a user; and
    a maintenance support device comprising
        an image analysis unit configured to extract information indicating an operational state of a piece of factory equipment, by
            detecting character regions and image regions in the real image captured by the image capture unit of the head-mounted display,
            taking out characters from the character regions, and recognizing image patterns in the image regions,
        a data storage unit configured to store the information indicating the operational state extracted by the image analysis unit,
        a data analysis unit configured to determine whether or not an abnormality has occurred in the piece of factory equipment, based on the information indicating the operational state stored in the data storage unit, and
        a display control unit configured to cause the display unit of the head-mounted display to display the augmented reality image in which the additional image is superimposed on the real scene, the additional image indicating maintenance information for the piece of factory equipment with respect to which the data analysis unit has determined that the abnormality has occurred, wherein the data analysis unit is configured to
- determine that the abnormality has occurred, in response to a difference between (i) a first change in the information indicating the operational state during a first time period and (ii) a second change in the information indicating the operational state during a second time period preceding the first time period being out of a predetermined range of difference, and
- determine that the abnormality has not occurred, in response to the difference between (i) the first change and (ii) the second change being within the predetermined range of difference, and the maintenance information for the piece of factory equipment is information on maintenance including at least one of replacing a component constituting a device, replacing tools, replacing provisions, replenishing consumables, changing design, emergency stop of a device or manufacturing line including the device, shutting down power supply, diversion operation, relocating devices and products, removing alien objects, adding to raw materials, adjusting temperature, adjusting humidity, adjusting atmospheric pressure, and cleaning.

8. The maintenance support system according to claim 7, wherein the head-mounted display further comprises a position information acquisition unit configured to acquire position information of the head-mounted display by using the Global Positioning System.

9. The maintenance support system according to claim 7, wherein the display unit is a see-through display configured to display the augmented reality image in which the additional image is superimposed on the real scene.

10. The maintenance support system according to claim 7, wherein the display unit is configured to display the augmented reality image in which the additional image is superimposed on the real image acquired by the image capture unit.

* * * * *